Dec. 27, 1966   F. K. SUZUKI ETAL   3,294,101
IMMERSION TREATMENT APPARATUS
Filed Sept. 8, 1964   5 Sheets-Sheet 1

INVENTORS
MICHAEL SPRINCZ
FRED K. SUZUKI
BY Frank J. Foley
ATTORNEY

INVENTORS
MICHAEL SPRINCZ
FRED K. SUZUKI
BY Frank J. Foley
ATTORNEY

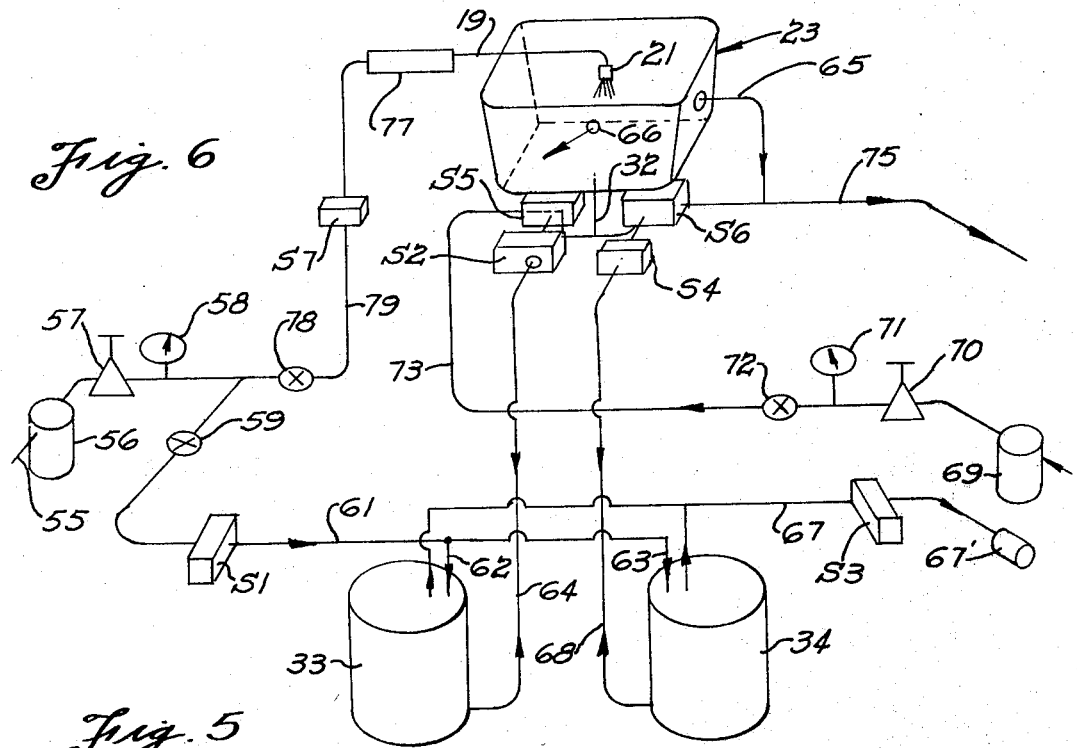
Fig. 6
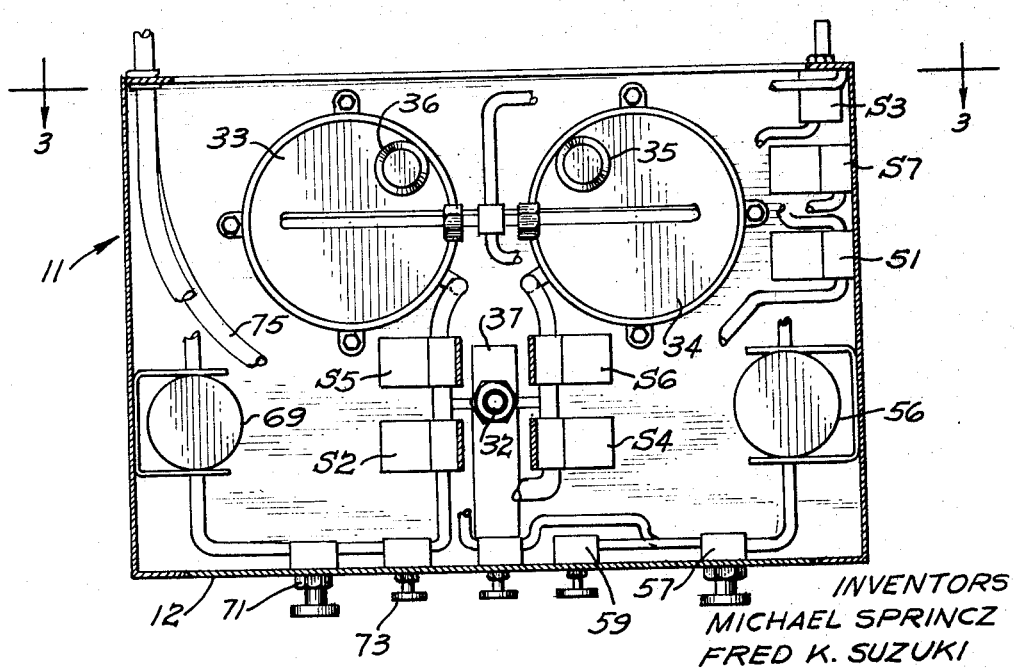
Fig. 5
INVENTORS
MICHAEL SPRINCZ
FRED K. SUZUKI
BY 
ATTORNEY Dec. 27, 1966
F. K. SUZUKI ETAL
3,294,101
IMMERSION TREATMENT APPARATUS
Filed Sept. 8, 1964
5 Sheets-Sheet 4
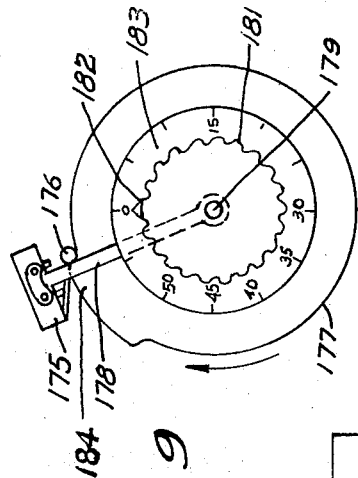
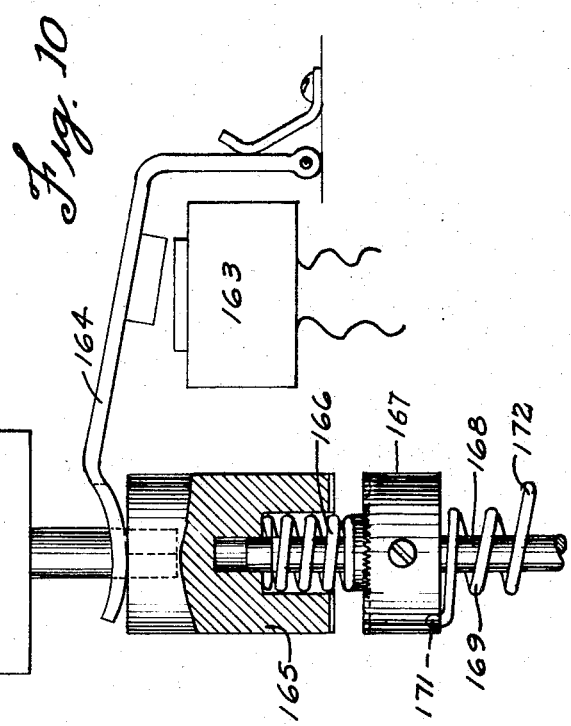
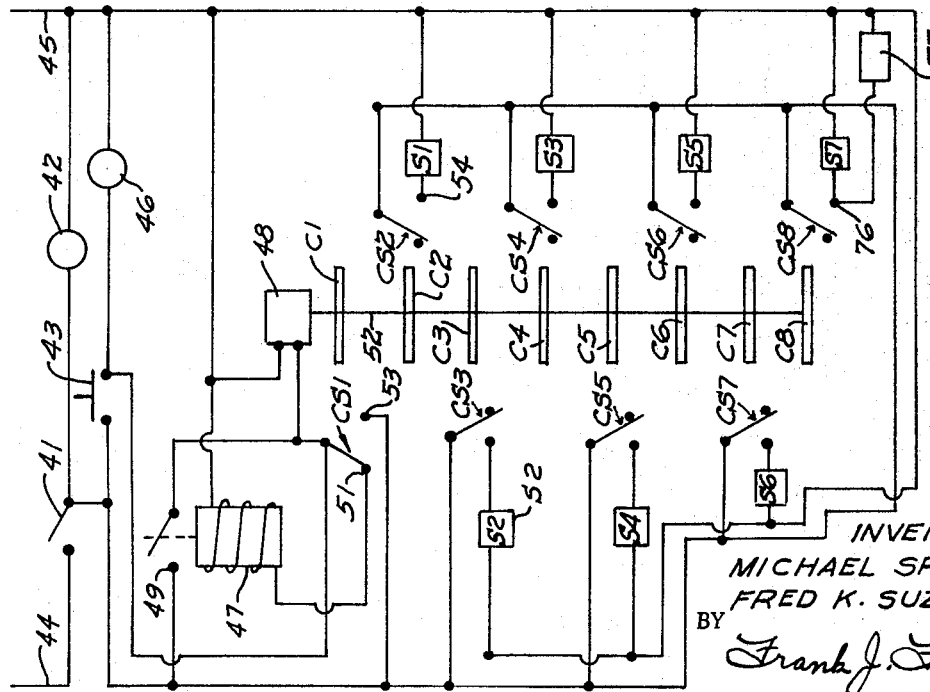
INVENTORS
MICHAEL SPRINCZ
FRED K. SUZUKI
BY
Frank J. Foley
ATTORNEY

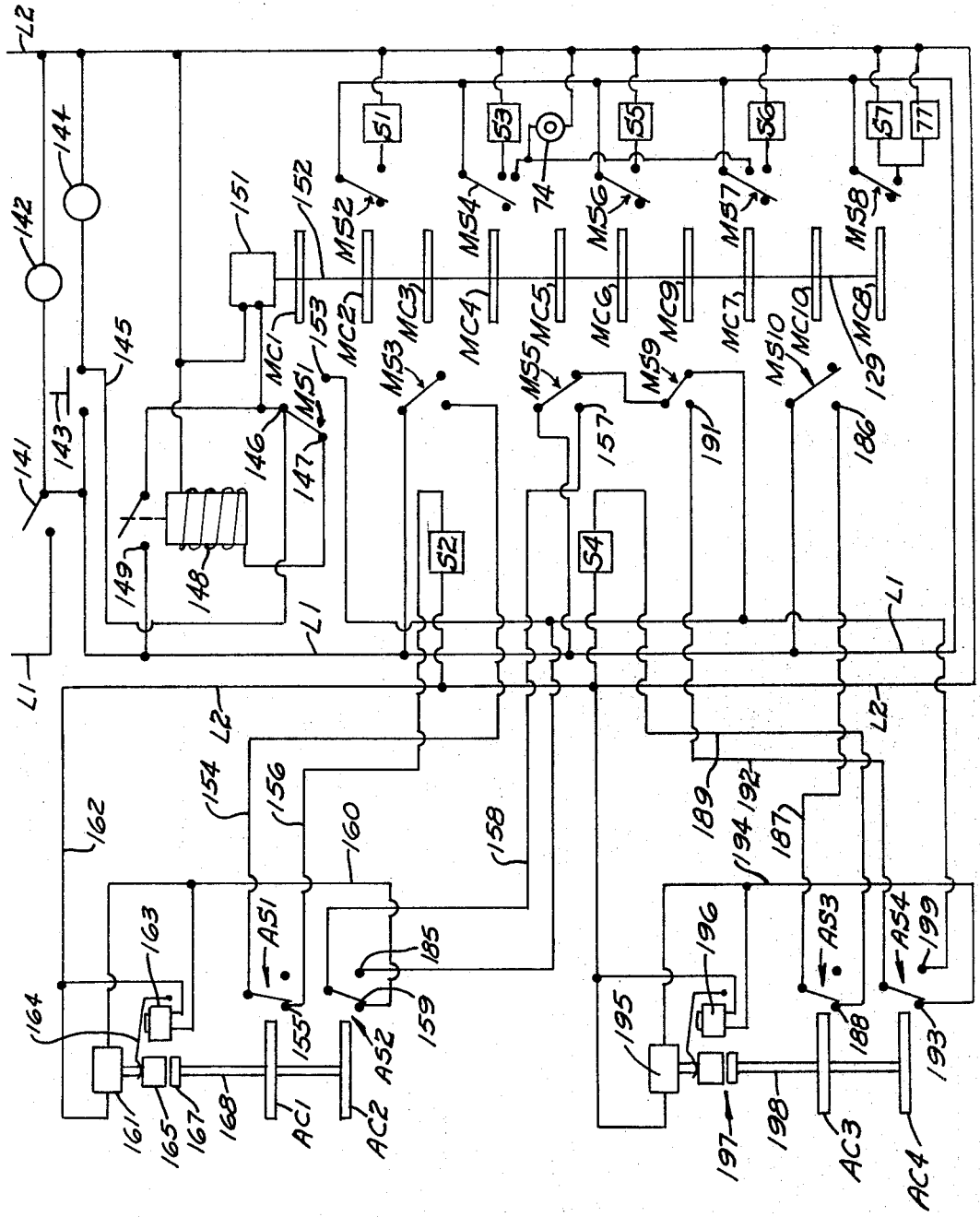

United States Patent Office 3,294,101
Patented Dec. 27, 1966

---

3,294,101
IMMERSION TREATMENT APPARATUS
Fred K. Suzuki and Michael Sprincz, Chicago, Ill., assignors to Delta Research, Inc., Chicago, Ill., a corporation of Illinois
Filed Sept. 8, 1964, Ser. No. 394,926
2 Claims. (Cl. 134—58)

This invention relates to apparatus for effecting automatically controlled immersion treatment of a batch or quantity of materials in a tank wherein they are subjected successively to contact by various treating liquids for controlled periods of time.

The invention further includes subjecting the materials to further treatments such as washing and drying in the tank after the liquid treatments.

As an illustration of one practical use of the invention there is described herein its application to the task of staining blood smears, a preliminary procedure which is performed daily in hospitals and clinics in connection with blood analysis.

For many years one of the most common methods of staining blood smears in hospitals has been this. A drop of blood is placed on each glass slide and smeared manually and the slides are then put into a slide tray. The tray is then manually placed in a vessel containing a quantity of staining solution, where it remains for a length of time which may vary as in accordance with the particular instructions received, and further may be varied in accordance with how closely the instructions are followed. Next, the slide tray is lifted manually out of the vessel containing the staining solution, and then is placed in another vessel holding a counter-stain solution, where it remains for a specified period. Next, the slides are washed either by dipping them into distilled water or by holding them in a stream of water issuing from a faucet.

The final step consists in drying the slides in ambient or heated air.

Staining of biological tissue is also commonly performed in a similar manner. A very thin slice of tissue, embedded in paraffin is fixed on a glass slide and the paraffin is removed by use of a solvent solution. The slide with the tissue is then placed in a tray which is then manually dipped into various staining solutions following a prescribed procedure. The laboratory technician must observe the time allotted for each staining solution very closely, remove the tray at a precise moment from one solution and then place it into the next solution where it is timed again. The number of solutions, washes and rinses may be as high as twenty depending upon the staining procedure prescribed for a particular type of tissue.

One familiar with the art can easily see the possibilities for error inherent in such a manual technique or procedure. Any negligence on the part of the technician or variation in procedure time does affect the outcome of the staining affinity for the material on the slide. The end result will be variation in the shade and intensity of the staining dye colors thereby affecting the clarity of cell differentiation.

It is a general object of this invention to provide an apparatus for automatically treating materials under controlled conditions, assuring exact duplication of the treating steps every time they are performed in the apparatus.

Another object of the invention is to provide an apparatus which automatically causes several treating solutions to flow one at a time into the tank or chamber in which is placed the material to be treated, holds each of the solutions in the chamber for a measured period of time, rinses the material with water after the initial treating, and then dries the material while it still remains in the chamber.

Another object of the invention is to provide an apparatus of the above described character which is so completely automatic in its operations that an operator needs only to place the material in the treating chamber, operate a starting switch, and need only return when the apparatus has completed the full treating cycle and has signalled that it has completed it.

Other objects and advantages of the invention will be mentioned hereinafter or will become apparent from a perusal of this specification, wherein a preferred embodiment of the invention is shown and described.

In the drawings, FIGURE 1 is a top plan view of a cabinet containing the apparatus of the invention.

FIGURE 5 is a top plan view of the cabinet interior as viewed along the broken line 5—5 of FIG. 3.

FIGURE 6 is a schematic showing of the mechanical components of the apparatus, and exclusive of electrical circuits.

FIGURE 7 is a schematic of one form of an electrical circuit, which provides for fixed timing of the operations.

FIGURE 8 is a schematic of an electrical circuit which provides for variable timing of the operations.

FIGURE 9 is a front elevational view of an adjustable timing mechanism, as viewed apart from the apparatus.

FIGURE 10 is an elevational view of the clutch mechanism for one of the variable cam assemblies.

Figure 1:
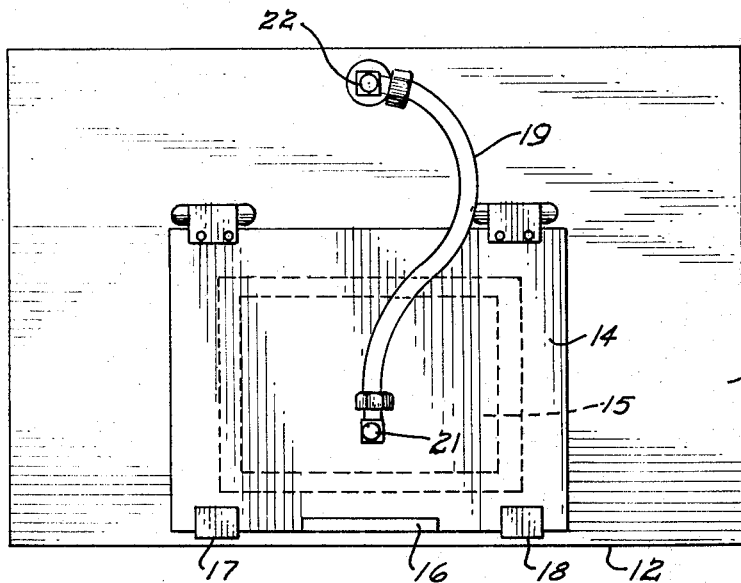
Figure 2:
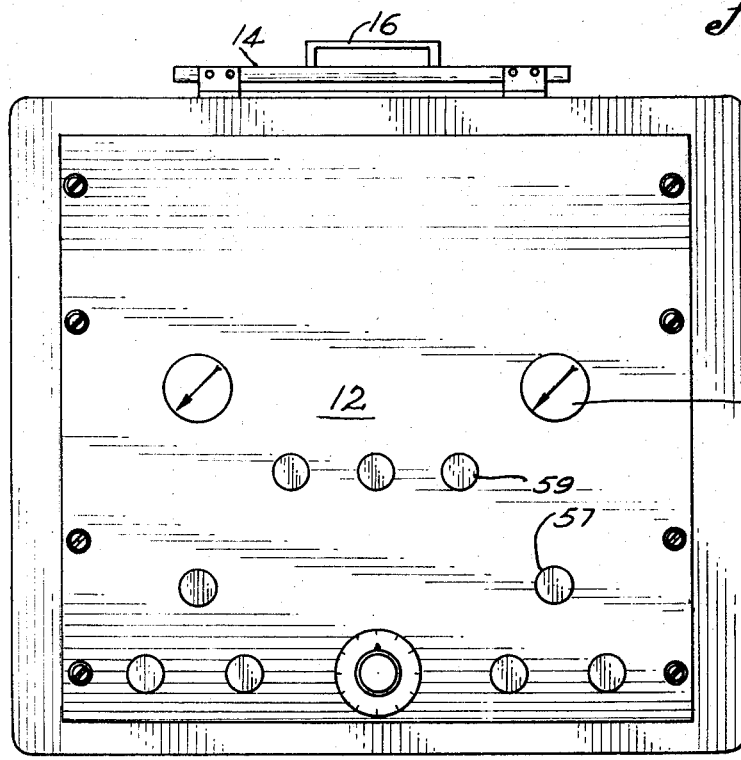
FIGURE 2 is a front elevation of the instrument panel of the cabinet.

Referring further to the drawings, the apparatus of the entire invention may conveniently be mounted compactly in a cabinet, generally indicated as 11 and having a front wall 12 which serves as the instrument panel. The top wall 13 supports a hinged lid 14 having a glass window 15, a handle 16 and suitable fasteners such as the magnetic fasteners 17 and 18. A flexible hose 19 is secured to a discharge nozzle 21 at its front end and its rear end to a coupling 22 connecting it to a source of heated air used for drying.

A tank or chamber 23, having its bottom 24 shaped and inclined for quick and complete draining, is secured by its top flange 25 to the top wall 13 of the cabinet.

A conventional slide rack 26, hitherto used merely for storing glass slides 27 on a laboratory bench when carrying blood smears, is in this invention seated in the tank 23 upon its bottom flanges 28 and 29, and to it is added a deflecting plate 31 extending horizontally between the flanges 28 and 29 beneath the slides to deflect and disperse liquids entering the tank through the bottom inlet pipe 32.

The staining solution first to be used, for example, a Wright staining solution, is stored in tank 33, while the counter staining solution is stored in tank 34 (FIG. 6). These two tanks are covered with air tight covers, which are provided with filling openings 35 and 36, suitably capped to make them air tight.

For operating and controlling the apparatus there is provided in the cabinet a plurality of cams fixed on a single shaft, which is driven by an electric motor, this compact assembly of cams and motor being suggested generally as 37 in FIG. 5, but shown schematically in FIG. 7 in the circuit drawing.

The switches in FIG. 7 are shown in the positions they occupy before the apparatus is started.

Figure 4:
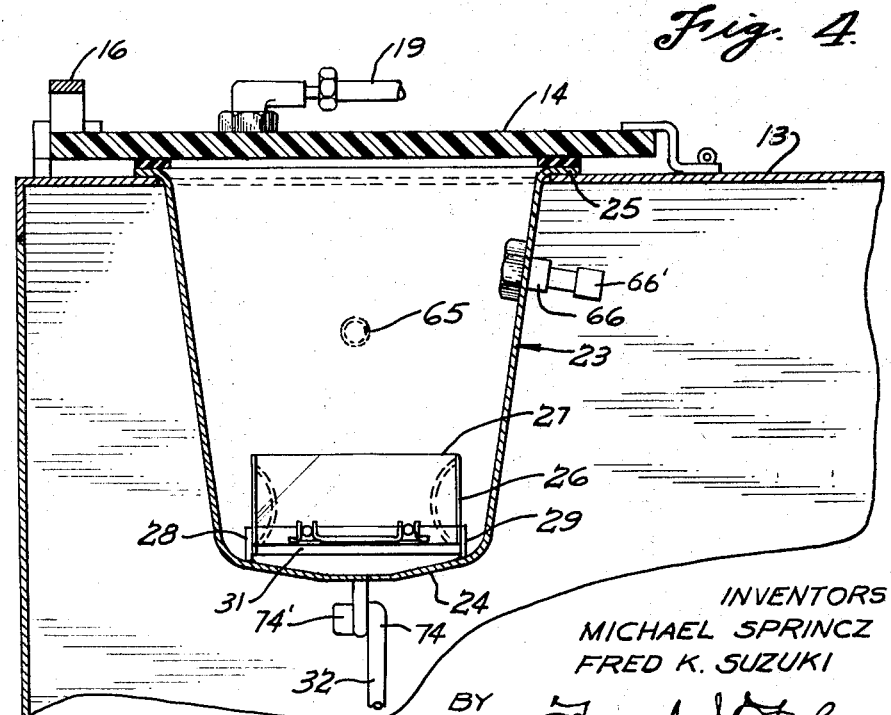
FIGURE 4 is a partial sectional view of the slide chamber, on a larger scale.

To start the operations of the apparatus, the laboratory attendant needs only to place the tray of glass slides, having blood smears on them into the tank 23, as shown in FIG. 4, close the tank cover 14, and then close main switch 41 (FIG. 7). Next, he momentarily pushes the starting switch button 43. When switch 41 closes, lamp 42 will light and thereafter remain lighted until this switch is reopened. When switch 43 is momentarily closed a circuit is established from power line 44 to the power line 45 through lamp 46, lighting the latter. At the same time a circuit is closed through the self-locking relay 47 and the cam shaft motor 48. The closing of contact 49 locks the relay in operated condition and maintains a circuit also for the timing motor 48 even though the switch 43 is closed only momentarily. The motor starts its timing cycle and thereafter controls all the operations. The circuit for holding the relay 47 energized relies in part on the closed contact of switch CS1 which is controlled by cam C1 on the cam shaft 52, which rotates very slowly, for example, making one complete revolution during a fixed period. This period, covering all the operations may be varied to meet the existing requirements for any particular task. As an illustrative but not limiting example, the steps being described could be completed in about 25 minutes.

The timing intervals now to be described are illustrative only, although they have been found to be entirely satisfactory for the staining treatment of blood smears. They are subject to variation, as circumstances may require or judgment dictates.

After about 40 seconds of the initial operation of the cam shaft 52, cam C1 will operate switch CS1, opening contact 51 and closing contact 53, thus deenergizing relay 47, without stopping the motor 48, as a new connection from the motor to the power line 44 is provided through the now closed contact 53 and closed switch 41. Lamp 46 will also remain lighted.

Cam C2 now operates switch CS2 and the then closed contact 54 closes a circuit to open the solenoid operated valve S1 for the purpose of supplying air under pressure from a compressed air source, ordinarily part of the usual equipment of a hospital. If necessary, however, a small air compressor and motor therefor could be placed in the cabinet. This air comes into the cabinet through pipe 55 (FIG. 6), passes through an air filter 56 and a manually adjustable pressure regulator 57, registers on a gauge 58, thence through manually adjustable needle valve 59, and to the valve S1, which being now open admits the filtered air at reduced pressure into the tops of the tanks 33 and 34, through lines 61, 62 and 63.

At the same time cam switch CS3 is operated by cam C3, to open solenoid valve S2, which allows the air pressure to elevate the first staining solution from tank 33 through pipe 64 and into the slide tank 23 through the inlet pipe 32.

Each storage tank 33 and 34 may be provided with more than enough liquid for completely submerging the slides in tank 23. The air supply control valves 57 and 59 will be so adjusted and coordinated with the timing of the cam switches CS2 and CS3 that as soon as the slides have been completely submerged, such as in about a minute, cam switches CS2 and CS3 will be restored to normal, allowing solenoid valves S1 and S2 to be closed by their conventional restoring springs. While the liquid is entering tank 23 the air displaced therefrom may be vented through pipe 66, equipped with an air filter 66′, for filtering vented and reentering air.

The first staining solution is allowed to remain in the slide tank about 2 to 2½ minutes, after which the interval cam C3 closes switch CS3, reopening the valve S2 to drain the solution back to tank 33 by gravity. At the same time the cam C4 closes switch CS4 to open solenoid valve S3, thus to permit displaced air and vapors from tank 33 to be vented to atomsphere through pipe 67 while the slide tank is draining. Draining and venting requires about 1½ to 2 minutes, after which cams C2 and C4 will cause valves S1 and S3 to be closed. The end of pipe 67 may be provided with a filter 67′.

Next, to introduce the counterstain solution into the slide tank, cam C5 actuates switch CS5 to cause valve S4 to open, and at the same time cam C2 operates the switch CS2 to again open solenoid valve S1 to apply air at a reduced pressure to the tank 34 (FIG. 6) for elevating the solution therefrom through pipe 68 into the slide tank. This introduction of the solution requires about one minute, after which cam C5 opens switch CS5, allowing valve S4 to be closed by its spring, while cam C2 opens switch CS2, thus enabling valve S1 also to close.

The counterstain solution remains in the slide tank for about 6 to 7 minutes, after which cam C5 closes switch CS5, again opening solenoid valve S4, and the solution then drains by gravity back to tank 34 in about 2 minutes, whereupon cam C5 reopens switch CS5, to allow valve S4 to close. During this draining operation, cam C4 will have closed switch CS4, to open solenoid valve S3 (FIG. 6), allowing air and vapors to be vented from tank 34 through pipe 67 to atmosphere, and at the end of the draining period cam C4 will open switch CS4, allowing valve S3 to close.

Rinsing of the slides is now conducted as follows. Cam C6 now closes switch CS6 to thus open valve S5 underneath the slide tank. The water supply, usually maintained at a moderately high pressure, upon entering the cabinet passes through a filter 69, then flows through the manually adjustable pressure regulator 70, past an indicating pressure guage 71, thence through a manually adjustable needle valve 72, through pipe 73 and through now open valve S5 and inlet pipe 32 into the slide tank.

Figure 3:
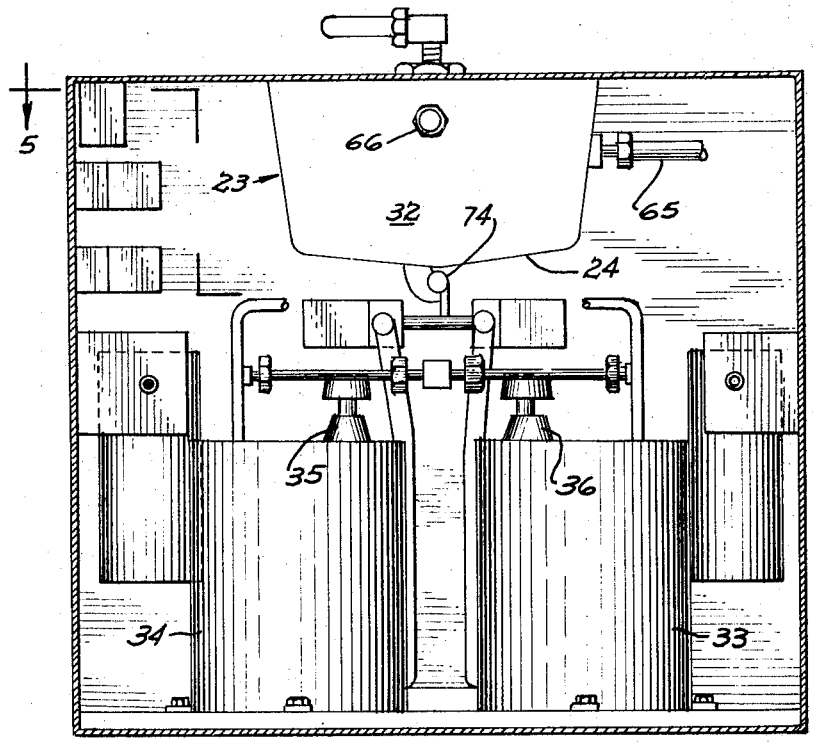
FIGURE 3 is an elevational view inside the cabinet as viewed approximately on the line 3—3 of FIG. 5.

While a centrifugal pump 74 is shown in FIGS. 3 and 4 interposed in the pipe 32 at the bottom of the slide tank 23, to be used optionally for quick emptying of any liquid from the slide tank, its use is described only in connection with the circuits of FIG. 8, wherein it is powered by an integral motor only for exhausting the liquid. When any solution or water is entering the tank it will readily pass through the blades of the idle pump, hence a reversibly powered pump is not needed.

This rinsing water is allowed to overflow through pipe 65 thence into pipe 75 to the sewer or to some other place of disposal, as it rinses the slides for about 2 minutes. At the end of the rinsing period, cam C6 will open switch CS6, allowing valve S5 to close, and cam C7 will close switch CS7, to open solenoid valve S6 which permits the water in the slide tank to drain through pipe 75 to the sewer.

The slides are now ready for air drying, which is performed as follows. Cam C8 closes switch CS8, and at the closed contact 76 of that switch circuits are completed to energize an air heater 77 and to open the solenoid valve S7. Compressed air then flows through the filter 56, pressure regulator 57, needle valve 78, pipe 79, the now open solenoid valve S7, air heater 77 and into the slide tank 23 through the flexible hose 19 and inlet nozzle 21, which will disperse the heated air as it enters the slide chamber. Air is vented through the vent 66. The smears on the slides can be dried in about 3 to 4 minutes, after which period cam C8 opens switch CS8, deenergizing both the heater and valve S7, shutting off the air stream.

The motor 48 is still continuing to rotate the cam shaft 52, and during this entire operating period following the first 40 seconds thereof, the cam C1 has maintained the switch CS1 with its contact 53 closed. However, when the cam shaft reaches the end of its cycle, here a 360 degree rotation, the cam C1 will cause switch CS1 to reassume the position shown in FIG. 7, and the cam shaft motor will thus be deenergized. At this time the lamp 46 will become extinguished, notifying the attendant that the entire cycle of operations has been completed, and that the dried slides may now be removed. If the apparatus is not to be used again immediately, the lamp 42 (FIG. 7) which is still lit, will suggest that the main switch 41 should be opened.

In some uses of the invention it will be desired that the apparatus be able to retain either the first or the second solution or both in contact with the blood smears, or other materials being treated, for periods of various lengths. To make this possible, the apparatus schematically shown in FIGURE 8 is provided, and will be utilized as follows. FIG. 8, as does FIG. 7, shows all switches at normal positions, before the starting of the apparatus.

Having placed a tray of glass slides bearing the blood smears, for example, in the tank 23 of FIG. 4, the operator will then close the main switch 141 of FIG. 8, and next momentarily push the starting switch button 143. When switch 141 closes, lamp 142 will light and remain lighted until switch 141 is reopened.

When switch 143 is momentarily closed a circuit is established from power supply line L1 through signal lamp 144 to power supply line L2, lighting the lamp. At the same time a circuit is established from L1 through closed switch 141, momentarily closed switch 143, line 145, contacts 146 and 147 of the cam switch MS1, through the winding of relay 148 to L2, thus energizing that relay and self-locking it operated through its then closed contact 149. At the time relay 148 is energized the main cam driving motor 151 is also energized and its cam shaft 152 begins to rotate.

After about 40 seconds of the initial rotation of the main cam shaft 152, the first cam MC1 will operate cam switch MS1, opening the previous circuit through contact 147 and closing one through contact 153. Thereupon the relay 148 is deenergized, but motor 151 will continue to operate, now being connected from L2 to L1 through contact 153 and the normally closed contacts of cam switches MS9 and MS5. Also, signal lamp 144 will remain lit, indicating that the apparatus is operating.

The next cam to operate a switch is cam MC2, actuating switch MS2, which energizes solenoid operated valve S1 of FIG. 8 to supply filtered air under pressure to the solution tanks 33 and 34, as explained heretofore in connection with the schematic circuit of FIG. 7.

Simultaneously with the supplying of air pressure by the actuation of switch MS2, the cam MC3 actuates switch MS3, which causes solenoid operated valve S2 of FIG. 8 to be opened, being energized by a circuit which may be traced from L1 through closed switch 141, operated switch MS3, wire 154, normally closed contact 155 of cam switch AS1 associated with the then stationary auxiliary cam AC1, thence wire 156 through solenoid S2 to power line L2. With valve S2 open, liquid from the first solution tank rapidly fills the slide tank 23, in about one minute or less, for example.

As soon as the contents of the first solution tank have been elevated into the slide tank, the cam MC2 will return switch MS2 to normal, allowing the air pressure supply valve S1 to close.

As the period or interval or retention of the first staining solution in the slide tank is, in this modified form of the invention, subject to variation by an adjustment which can be made by the operator, the mechanism for this interval timing feature will now be described.

At the moment the slide tank 23 becomes filled with the first staining solution the retention period timing is inaugurated. At this moment cam MC5 of FIG. 8 operates its associated cam switch MS5, thus breaking the circuit which had heretofore supplied current to the main timing motor 151. The main cam shaft, therefore, stops but cam MC3 still holds switch MS3 operated. Simultaneously, a circuit is now established from L1 through operated switch MS5 and its contact 157 through wire 158, normally closed contact 159 of switch AS2, wire 160 to the auxiliary timing motor 161 and wire 162 to power line L2.

At the same moment that the auxiliary cam motor 161 is energized it will be noted that the clutch relay or solenoid 163 is energized by this circuit, bifurcated armature arm 164 bears down on the upper section 165 of the positive clutch, (FIG. 10) compressing the spring 166 and engaging the radially serrated face of clutch section 165 with the radially serrated face of clutch section 167 to start the cam shaft 168 rotating. This rotation of the cam shaft begins to wind the reset or restoring spring 169, one end 171 of which is anchored in the clutch member 167, while its other end 172 is anchored to an adjacent stationary part of the machine frame (not shown).

The design of the auxiliary interval timing apparatus is such that its shaft 168 is allowed to rotate only about five sixths, more or less, of a complete revolution. By a suitable speed reduction gear train, conventionally used with such motor driven timing cam shafts, a slow revolution of the shaft combined with its cams and adjustable cam operated switch can be made to produce whatever intervals are required by the particular operation. The interval possibilities indicated in FIG. 9 are suggestive only, not limiting.

The circuit schematics conventionally suggest the relation between the cams and their associated switches. Actually, one may employ any suitable switch, and a familiar "Micro" switch 175 is shown in FIG. 9 having a pivoted cam follower 176 for engagement with such conventional depressed or raised portions on the cam periphery as the needs of the operation require. One cam 177 is shown in FIG. 9, such as may be mounted in the cabinet on cam shaft 168. The adjustably mounted switch 175 is secured on an arm 178 fixed on a stub shaft 179 aligned and coaxial with cam shaft 168, and on that part of stub shaft which extends to the outer side of the cabinet there may be fixed a knurled knob 181 carrying an integral pointer 182 which may be rotated by the knob to register at a selected interval indicia, in minutes, for example, on the stationary indicia plate 183, at which it is desired to terminate a retention period, the arm 178 bodily carrying the switch as the knob is rotated.

The switch AS1 of FIG. 8 may be a Micro switch stationarily mounted on the cabinet in such a position relatively to a raised portion (not shown) on cam AC1 as to be moved out of normal after the cam has rotated 2 or 3 degrees and held open as long as the cam is rotating away from its starting position. This switch needs no adjustment. However, switch AS2, which is employed to determine the length of the first solution retention period, should be mounted on the adjustable arm 178 (as is switch 175) adjoining its cam AC2 and rotated away from the starting position of cam projection 184 an arcuate distance sufficient to measure in minutes, for example, the desired retention period before projection 184 reaches the switch AS2 to shift that switch out of normal and close the contact 185.

As soon as the auxiliary cam shaft 168 begins to rotate, the cam AC1 opens the switch AS1, depriving solenoid valve S2 of current, which thereafter is closed by its conventional self closing spring, thus to hold the first solution in the slide tank. The auxiliary motor 161 continues to operate and when the preset interval for this interval timer has expired the cam AC2 actuates switch AS2, which produces several results instantaneously.

The circuit which kept clutch relay 163 and auxiliary motor 161 energized is now opened. The motor stops. The clutch is opened up by its spring 166 and this enables the restoring spring 169 to rotate the cam shaft back to its starting position.

As soon as switch AS2 was actuated as above explained and before timer shaft 168 is reset, the circuit established through contact 185 of switch AS2 immediately restores power to the main cam motor 151 which rotates and cam MC5 quickly restores switch MS5 to the position shown in FIG. 8, thus maintaining power on motor 151 while switch AS2 is being restored to the position shown in FIG. 8.

When the cam shaft 168 is thus reset to its starting position cam switch MS3 is still being held operated by its associated cam MC3, and, accordingly, a circuit through switches AS1 and MS3 applies current to valve S2 to open it for draining the first solution from the slide tank 23. The main cam shaft 152 is rotating at this time and its cam MC4 next closes switch MS4, applying current to open the air vent solenoid valve S3 and at the same time applying to a built in integral motor 74' of the centrifugal pump 74, shown in FIGS. 3 and 4, but not heretofore used. This evacuating pump will hasten the draining of the first solution through the now open valve S2 into the tank 33 in a matter of seconds, the air displaced from tank 33 being discharged to atmosphere through the now open valve S3.

When draining and venting are completed, the solenoid valves S2 and S3 will be closed when de-energized by their respective cams MC3 and MC4, and pump 74 will be stopped. The system is now ready for introduction of the second solution into slide tank 23 and its retention therein for an interval which may be determined by manual adjustment of the second timer shown in the lower left corner of FIG. 8. This interval timer is identical in construction with the one just described, and illustrated in FIGS. 9 and 10.

Cam MC2 will now actuate switch MS2 to open valve S1 to put air pressure on both solution storage tanks. The cam MC10 now actuates switch MS10 to apply current to the solenoid valve S4, the circuit being traced from L1 through closed contact 186 of switch MS10, line 187, contact 188 of switch AS3, line 189, S4 to L2. The opening of valve S4 permits the second solution to enter the slide tank responsive to air pressure, covering the slides in about a minute, after which cam MC2 allows switch MS2 to open to enable valve S1 to close. Cam MC9 now actuates switch MS9 which cuts off power from the main cam motor 151, and applies power from L1 through switch MS5 and contact 191 of operated switch MS9, through line 192 to contact 193 of unoperated switch AS4, and line 194 simultaneously to auxiliary motor 195 and clutch relay 196 to L2, thus starting that motor, closing clutch 197 and starting the interval timing cam shaft 198.

The initial rotation of cam shaft 198 causes cam AC3 to actuate switch AS3 thus breaking the circuit which had previously caused solenoid valve S4 to open to admit the second stain solution. Valve S4 now becomes closed by its own spring. The second soaking period is now in progress, and its duration is determined by the previous setting of switch AS4, which like switch AS2 is mounted and adjustable as illustrated by switch 175 shown in FIG. 9.

When the second soaking interval has been completed the cam AC4 will actuate switch AS4, thus completing a circuit from L1 through switches unoperated MS5 and operated MS9, through contacts 191 and 199 to the main motor 151, restarting it. The actuation of switch AS4 also cuts off power from auixiliary motor 195 and clutch relay 196, and this interval timer is immediately restored by its restoring spring to its normal starting position automatically in the same manner as was the other interval timer, as described heretofore.

When the second interval timer has been restored to starting position, the operated cam switch MS10 and switch AS3 combine to complete a circuit through valve S4 to open it for draining the second solution from the slide tank 23, while cam MC4 actuates switch MS4 to cause the vapor vent valve S3 to open during the draining period, at the end of which period cam MC10 opens switch MS10 to enable the solenoid valve S4 to close. As happened during the draining of the first solution, when cam MC4 actuated switch MS4 to open the air vent valve, S3, switch MS4 also started pump 74 to hasten the draining of the second solution through open valve S4 to tank 34. When this draining is completed, cam MC4 releases both the valve S3 and the pump.

Customarily, blood sample slides, after staining, are washed with water, and then dried. This apparatus performs these next two steps, as follows, under the control of the cam shaft 152.

Cam MC6 will now actuate switch MS6 to cause valve S5 to open, thus admitting water to the slide tank or slide chamber 23. This water is allowed to overflow through pipe 65 into pipe 75, and thence into the sewer. After about 2 minutes of rinsing, cam MC6 will open switch MS6, allowing valve S5 to close, and cam MC7 will actuate switch MS7, to open solenoid valve S6 which permits the water remaining in the slide chamber 23 to drain through pipe 75 to the sewer. FIG. 8 shows that when switch MS7 is closed, pump 74 also operates to speed up the draining of wash water from the slide tank. Cam MC7 will stop the pump and close valve S6 when the water has been drained. If desired, cams MC6 and MC7 may be designed to cause this rinsing cycle to be repeated several times.

The slide are now ready for drying, which is performed as follows. Cam MC8 now actuates switch MS8, which causes air valve S7 to open and the air heater 77 to be energized, introducing heated air into the slide chamber 23 in the identical manner heretofore described, drying the slides in about 3 or 4 minutes, after which the cam MC8 opens switch MS8, deenergizing valve S7 and the heater 77, shutting off the air stream.

Since the conclusion of the second measured detention period the motor 151 has continued to run, and cam MC1 has continued to maintain the switch MS1 with its contact 153 closed. However, when the cam shaft 152 reaches the end of its 360 degree rotation, the cam MC1 will cause the switch MS1 to resume the position shown in FIG. 8, and thus power will be cut off from motor 151. At this time the lamp 144 will become extinguished, notifying the attendant that the entire cycle or sequence of operations has been completed, and that the dried slides may now be removed for the customary microscopic examination.

It will now be perceived that the apparatus has been designed and constructed for performing a sequence of operations, each step of which is cam controlled precisely. Hence, this sequence may be performed on batches of material again and again, giving each batch an immersion treatment which is identical with that given all other batches, a uniformity of treatment virtually impossible of attainment heretofore. The microscopic examination may proceed under the assurance that all samples have been treated identically.

It should be understood that, while specific embodiments of the invention are herein shown and described, the invention is not limited thereto, but is susceptible of further modification and variation without departing from the scope of the invention defined in the claims appended hereto.

Having shown and described our invention, we claim:

1. In an apparatus for automatically effecting immersion treatment of materials, an immersion chamber for containing the materials and having a bottom drain pipe, closed liquid storage tanks at a lower level than said chamber, a supply pipe connecting each tank bottom with said drain pipe, a solenoid operated valve in each supply pipe at its juncture with said drain pipe, a motor driven main shaft having cams thereon, means including a solenoid operated valve adapted for supplying compressed air to said tanks to force liquid therefrom through the supply pipes and drain pipe into said chamber, a motor driven auxiliary cam shaft with cam means thereon, means including cam means on the main cam shaft adapted to establish circuits to energize the auxiliary cam shaft motor and to deenergize the main cam shaft motor for initiating the retention period for a treating liquid held in the immersion chamber, means including a manually adjustable switch coacting with the auxiliary cam means for terminating the retention period and re-energizing the main cam shaft motor, means including a solenoid operated valve adapted for venting air from said tanks, means including solenoid operated valves adapted for introducing wash water into said chamber and for draining the water, means including an air heater and a solenoid operated valve for supplying drying air to said chamber, and switches operated by said main shaft cams in a predetermined sequence adapted for controlling said solenoid operated valves.

2. In an apparatus for automatically effecting immersion treatment of materials, an immersion chamber for containing the materials and having a bottom drain pipe, a motor driven pump interposed in said drain pipe adapted when driven to discharge liquids downwardly and when idle to permit upward flow therethrough, closed liquid storage tanks at a lower level than said chamber, a supply pipe connecting each tank bottom with said drain pipe, a solenoid operated valve in each supply pipe near its juncture with said drain pipe, a motor driven main shaft having cams thereon, means including a solenoid operated valve adapted for supplying compressed air to said tanks to force liquid therefrom through the supply pipes and drain pipe into said chamber, a motor driven auxiliary cam shaft with cam means thereon, means including cam means on the main cam shaft adapted to establish circuits to energize the auxiliary cam shaft motor and to deenergize the main cam shaft motor for initiating a retention period for a treating liquid held in the chamber, means including a manually adjustable switch coacting with the auxiliary cam means for terminating the retention period and reenergizing the main cam shaft motor, means including a solenoid operated valve adapted for venting air from said tanks, means including solenoid operated valves adapted for introducing wash water into said chamber and for draining the water, circuit means adapted for energizing said pump motor simultaneously with the actuation of the air venting valve and the water draining valve, means including an air heater and a solenoid operated valve for supplying drying air to said chamber, and switches operated by said main cam shaft cams in a predetermined sequence for controlling said solenoid operated valves.

References Cited by the Examiner
UNITED STATES PATENTS

| | | | |
|---|---|---|---|
| 1,955,169 | 4/1934 | Bertschinger | 134—98 |
| 2,493,120 | 1/1950 | Eaton | 134—94 X |
| 2,634,735 | 4/1953 | Buck | 134—58 X |
| 2,869,509 | 1/1959 | Woods | 134—58 X |
| 2,894,482 | 7/1959 | Gorham | 134—58 X |
| 2,959,151 | 11/1960 | Ehrlich | 118—429 |

CHARLES A. WILLMUTH, *Primary Examiner.*

R. L. BLEUTGE, *Assistant Examiner.*